(12) United States Patent
Mensales et al.

(10) Patent No.: US 7,600,903 B2
(45) Date of Patent: Oct. 13, 2009

(54) LIGHT DEVICE WITH PIVOTING PLATE, IN PARTICULAR FOR AUTOMOBILES

(75) Inventors: Alexander Mensales, Bobigny (FR); David Hue, Bobigny (FR)

(73) Assignee: Valeo Vision, Bobigny Cedex (FR)

( * ) Notice: Subject to any disclaimer, the term of this patent is extended or adjusted under 35 U.S.C. 154(b) by 0 days.

(21) Appl. No.: 10/846,796

(22) Filed: May 14, 2004

(65) Prior Publication Data

US 2004/0228137 A1    Nov. 18, 2004

(30) Foreign Application Priority Data

May 16, 2003    (FR)    ................... 03 05926

(51) Int. Cl.
*F21S 8/10*    (2006.01)
(52) U.S. Cl. ...................... 362/507; 362/539
(58) Field of Classification Search ................ 362/507, 362/510, 512, 539, 293, 324, 457, 458; 318/139, 318/432–434; 388/800, 806, 823, 903, 930
See application file for complete search history.

(56) References Cited

U.S. PATENT DOCUMENTS 6,467,940 B2 *    10/2002    Eschler et al. .............. 362/510
6,556,778 B2 *    4/2003    Zhang et al. ................ 388/806
6,742,742 B2 *    6/2004    Claudet .................... 244/17.13

FOREIGN PATENT DOCUMENTS

| DE | 38 06 658 | 9/1989 |
|----|-----------|--------|
| EP | 0 411 544 | 2/1991 |
| EP | 0 479 634 | 4/1992 |
| EP | 1 288 563 | 3/2003 |

OTHER PUBLICATIONS

French Patent Office; Search Report of corresponding French Patent Application No. 03 05926, filed on May 16, 2003; 2 pages.

* cited by examiner

*Primary Examiner*—Sharon E Payne
(74) *Attorney, Agent, or Firm*—Locke Lord Bissell & Liddell LLP

(57) ABSTRACT

In the invention, a light device is proposed equipped with a DC motor for causing the tilting of a pivoting plate, in addition, in the invention, a solution is proposed for preventing the DC motor from degrading too quickly. To this end, it is therefore proposed to limit, for example by means of an electronic control card, the supply current to the motor to a limitation threshold, at least during the phases in which the DC motor is functioning in locked torque.

17 Claims, 2 Drawing Sheets

Fig. 1
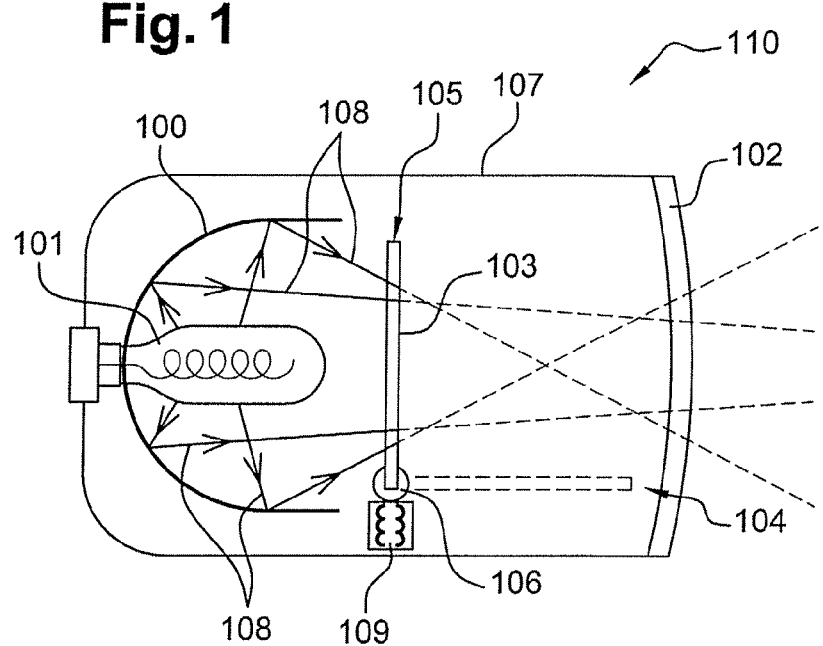
Prior Art
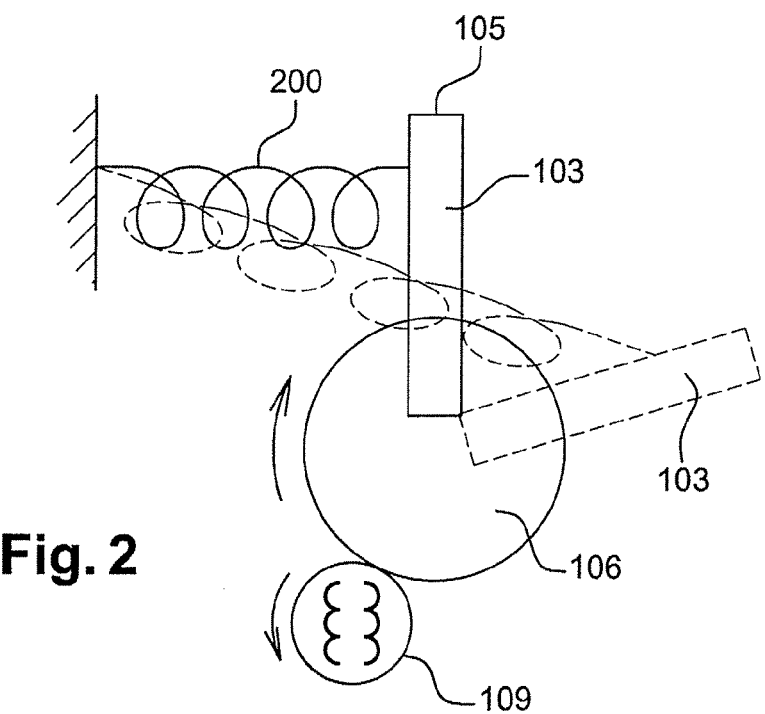
Fig. 2

LIGHT DEVICE WITH PIVOTING PLATE, IN PARTICULAR FOR AUTOMOBILES

FIELD OF THE INVENTION

The object of the present invention is a light device equipped with a pivoting plate. In general terms, the pivoting plate equipping the light device according to the invention can move, on command, between a first position, referred to as the active position, in which light signals, emitted by a light source of the light device equipped with said plate, encounter the pivoting plate, and a second position, referred to as the passive position, in which the light signals do not encounter the pivoting plate. The aim of the invention is essentially to propose a means of actuating the pivoting plate which is reliable, economical, compact, lightweight, with low electrical consumption and releasing little heat.

BACKGROUND OF THE INVENTION

The field of the invention is, in general terms, that of automobile lights. In this field, various types of light device are known, amongst which there are essentially:

parking lights, of low intensity and range;

passing, or dipped, headlights, with greater intensity and range on the road of around 70 meters, which are used essentially at night and where the distribution of the light beam is such that it makes it possible not to dazzle the driver of a vehicle being passed;

long-range headlights, and supplementary lights of the long-range type, where the area of vision on the road is around 200 meters, and which must be switched off when passing another vehicle in order not to dazzle its driver;

fog lights.

In addition, an improved type of light is known, referred to as a dual-function light, which combines the functions of dipped and long-range lights: for this purpose, it is possible for example to dispose inside the dual-function light a movable shield, for example a metallic plate, able to move on command from a first position in which it obscures part of the light signal produced by the light source of the light, the range or the light being thus limited to that of dipped headlights in order not to dazzle the other drivers, to a second position in which it does not obscure the light signal produced by the light source of the light, the range of the corresponding light then being that of main beam headlights. This example embodiment is principally used in light devices of the elliptic type.

A particular type of light is also known which makes it possible, in particular at night, to obtain a visible image of the road on a monitoring screen. This type of light is in fact a light of the main beam type, equipped with a tilting infrared filter, which can on command move from a first position in which it filters all the light signals produced by the light source of the light, so that only the non-dazzling infrared rays effectively emerge from the light device, to a second position in which the filter does not obscure any light signal produced by the light source of the light, the range of the light then corresponding to that of main-beam lights.

In the context of the invention, the movable shield and the infrared filter are two particular examples of a pivoting plate equipping the light devices according to the invention. In general terms, the devices to which the invention relates are all those which are capable of being equipped with a pivoting plate, independently of the function fulfilled by the said pivoting plate, capable of tilting between two operating positions.

One example of such a known device of the state of art is shown, in section and plan view, in FIG. 1. The example depicted corresponds to a headlight 110, of the elliptic type, equipped with an infrared filter 103. The headlight 110 comprises essentially a reflector 100, a light source 101, emitting light signals 108, disposed close to the apex of the reflector 100, and an exit lens 102 disposed so as to obtain a light beam satisfying the requirements of the various standards. The light signals 108 are emitted either directly towards the exit surface 102, or indirectly after having undergone any diversion and/or reflections. The infrared filter 103 is disposed in the headlight 110. The infrared filter 103 is movable, that is to say capable of moving between a first approximately vertical position 105 in the figure, referred to as the active position, in which the majority of the light signals emitted by the light source 101 pass through the filter 103, and a second position 104 approximately horizontal in the figure, referred to as the passive position, in which none of the light signals emitted by the light source 101 passes through the filter 103. Each filter 103 can consist of a plate of rectangular or circular shape able to pivot about a rotation axis 106, for example attached to a housing 107 constituting the enclosure of the headlight 110. The rotation axis 106 is driven by a motor 109, which makes it possible to make the filter 103 tilt from the first position 105 to the second position 104.

The various standards in force require the pivoting plates, disposed in the light devices, whether it is a case of an infrared filter or a movable shield, to return to a secure position in the case of malfunctioning of the light device in question. The secure position is that in which the light device causes the least possible nuisance for the other drivers. As it happens, in both cases, the secure position corresponds to the first vertical position of the pivoting plate within the light device. In the state of the art, illustrated in FIG. 2, when a malfunctioning of the motor 109 occurs, a return spring 200 automatically returns the pivoting plate, for example the infrared filter 103, into the secure position.

In the state of the art, in order to make the pivoting plate 105 move, an actuator 109 of the solenoid type is normally used, rotary or linear, whose main quality is longevity. However, the use of solenoid motors in light devices presents a certain number of drawbacks: this type of actuator is very bulky, particularly heavy, and its operating characteristics depend greatly on the variations in temperature in the environment in which it functions.

It is an object of the invention to respond to all the drawbacks which have just been mentioned. To this end, according to the invention, a light device is proposed equipped with a DC motor for causing the tilting of a pivoting plate. In addition, in the invention, a solution is proposed for preventing the DC motor from degrading too rapidly. This is because the risks of degradation of a DC motor are greater than those incurred with a solenoid motor: once the pivoting plate has been brought into its second position, the DC motor begins a so-called holding phase, in locked torque, in order to keep the pivoting plate in the second position. During this phase, the DC motor behaves electrically like a simple resistor. Its current consumption then increases greatly, the power to be dissipated then rapidly becoming too great to ensure the integrity of the motor. In the invention, it is therefore proposed to limit the motor supply current, for example by means of an electronic control card, at least during the phases where the DCT motor is functioning in locked torque.

SUMMARY OF THE INVENTION

The invention therefore essentially concerns a light device comprising at least:
- a light source emitting light signals towards an exit surface of the light device in order to produce a light beam;
- a pivoting plate able to move between a passive position in which it does not intercept the light signals emitted by the light source and an active position in which it intercepts at least some of the light signals emitted by the light source;
- a motor for causing the movement of the pivoting plate and causing it to pass from the active position to the passive position;
- a return spring for returning the pivoting plate from the passive position to the active position when the motor is no longer electrically supplied;
- the movement of the pivoting plate being broken down into a first initialization phase, a second transition phase, and a third holding phase, and the motor being a DC motor whose current supply is limited to a previously determined limitation threshold, at least during part of the holding phase.

The light device according to the invention can also have, in addition to the principal characteristics stated in the previous paragraph, one or more of the following secondary characteristics:
- the limitation of current to the limitation threshold is observed throughout the holding phase;
- the limitation of current to the limitation threshold is observed as soon as the DC motor is put in action;
- the limitation threshold corresponds to a value of the intensity of the motor supply current in order to obtain a mechanical torque of the motor necessary in order to compensate for the effect of the return spring during the holding phase;
- the limitation threshold is calculated for a maximum temperature liable to be reached by the light device;
- the limitation of the current supply of the DC motor is achieved by means of an electronic control card;
- the pivoting plate is an infrared filter;
- the pivoting plate is a movable shield for producing a dual-function dipped/main beam light.

Another object of the invention is an automobile equipped with a light device comprising the previously stated principal characteristics and possibly one or more secondary characteristics which have just been mentioned.

The invention and its various applications will be better understood from a reading of the description which follows and an examination of the figures which accompany it. These are presented only as an indication and are in no way limiting of the invention.

BRIEF DESCRIPTION OF THE DRAWINGS

In FIG. 1, already described, a schematic representation of a light device of the state of the art using a pivoting plate;

In FIG. 2, also already described, a schematic representation of the principle of tilting of the pivoting plates in the state of the art;

DESCRIPTION OF THE PREFERRED EMBODIMENTS

The elements appearing in different figures keep the same references.

Figure 3:
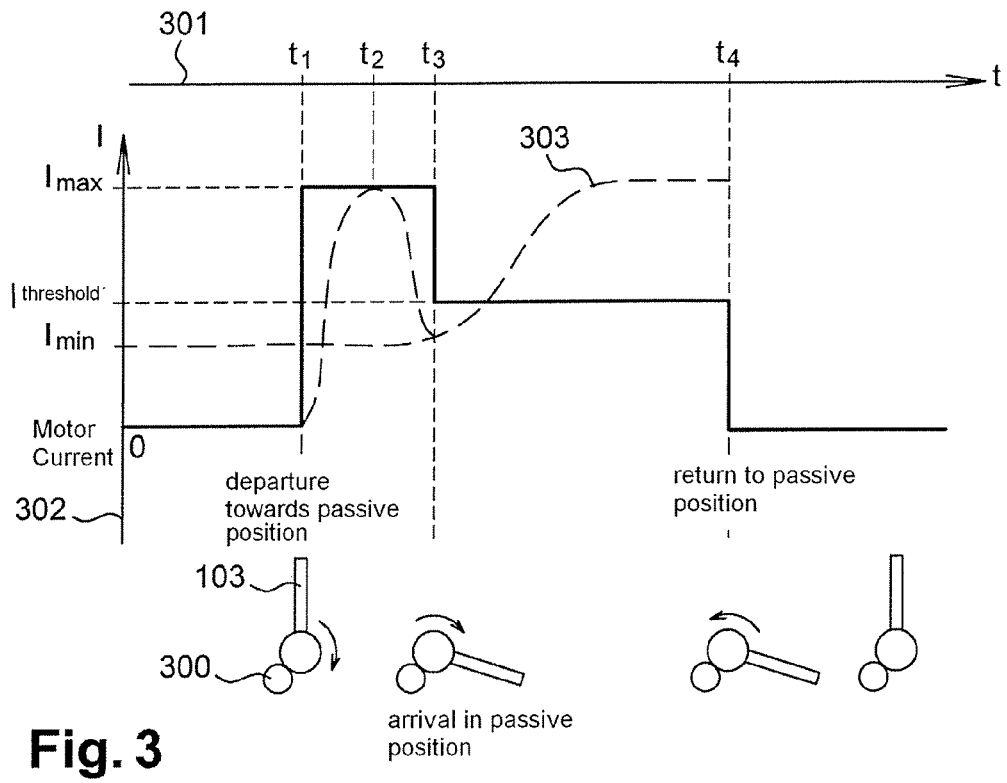
In FIG. 3, a schematic representation of an operating cycle of the light device according to a first example embodiment according to the invention.
Figure 4:
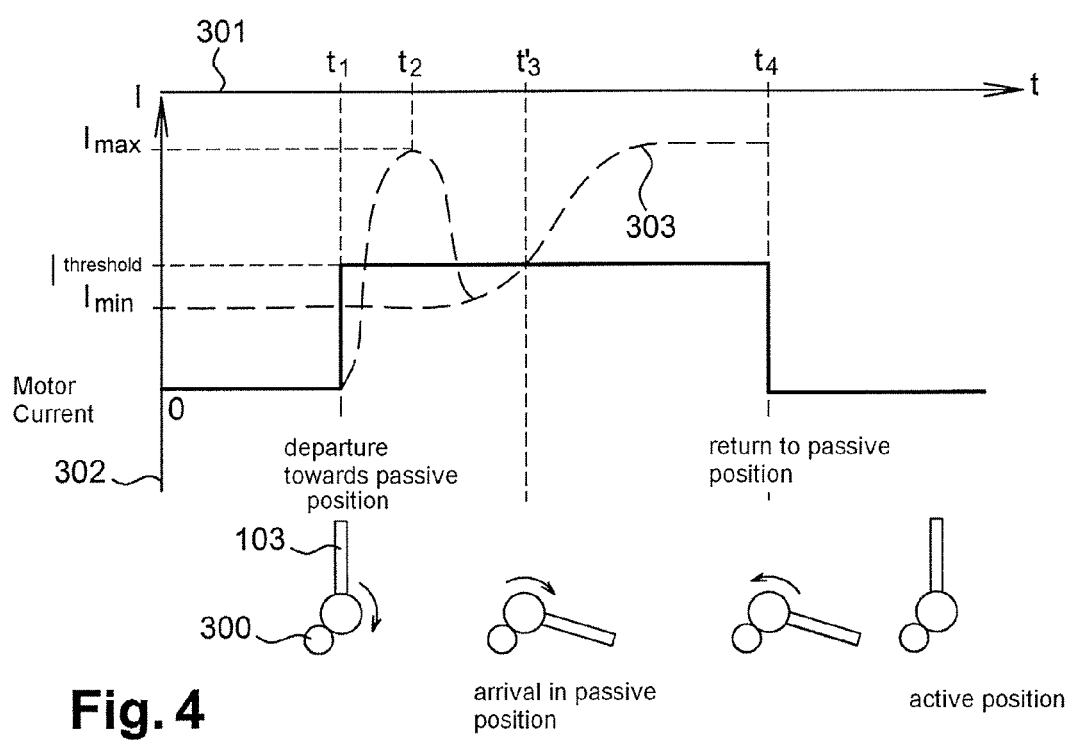
In FIG. 4, a schematic representation of an operating cycle of the light device according to a second example embodiment according to the invention.

FIG. 3 and FIG. 4 depict two examples of operation of the light device according to the invention, showing the change over time in the intensity of the current consumed by the DC motor. A curve 303, shown in a broken line, illustrates the change, before the invention, in the current supplying a DC motor 300. The time is marked by a horizontal axis 301, the intensity of the current by a vertical axis 302.

The first example, corresponding to FIG. 3, is considered first of all. At a time t1, the pivoting plate 103 begins a movement for moving from the active position to the passive position, following for example an action by the driver. The time t1 marks the start of an initialization phase, which ends at a time t2, corresponding to a maximum current consumption Imax of the DC motor 300. The current peak observed is necessary for putting the pivoting plate 103 in movement, the change from an immobile state to a mobile state of the pivoting plate 103 requiring a current consumption approximately equivalent to that observed for operation in locked torque.

The pivoting plate 103 is in movement until a time t3, a time at which it arrives in its passive position. The movement phase, situated between times t2 and t3, is a so-called transition phase in which the consumption of electric current of the DC motor decreases progressively in order to reach a minimum value Imin in the operating cycle of the motor. The value Imin is reached at time t3 or before this time. As from time t3, a so-called holding phase is begun in which the pivoting plate 103 is locked in its passive position, the DC motor then functioning in locked torque.

Before the invention was put in place, the current consumption then increased once again, as from time t3, until it was around a value close to the maximum consumption Imax, as illustrated by the curve 303. In the invention, it is proposed to limit the intensity of the current consumed by the DC motor to a value $I_{threshold}$, designated as a limitation threshold.

In the first example illustrated the limitation of current to the limitation threshold is effective during at least part of the holding phase, advantageously throughout the holding phase. This holding phase ends at a time t4 marking the return of the pivoting plate 103 into its active position, for example by virtue of the return spring 200, the DC motor then no longer being supplied.

In the second example illustrated, corresponding to FIG. 4, the limitation of current to the limitation threshold $I_{threshold}$ is effective right from the start, that is to say as soon as the DC motor 300 is switched on. Thus, in the second example illustrated, the maximum intensity Imax is never reached, even during the initialization phase. One immediate consequence of this initial limitation is that the initialization and transition phases are slightly longer in the first example illustrated, the motor torque available now being less great. The transition phase therefore ends at a time t3' subsequent to the time t3 in FIG. 3.

In all the example embodiments of the invention, the limitation threshold is determined in advance so that the DC motor 300 produces sufficient mechanical torque to hold the pivoting plate 103 in its passive position, a position which corresponds to a maximum tension of the return spring. In addition, the determination of a limitation threshold is made under the least favorable temperature conditions for the functioning of the motor, typically at an ambient temperature of 135 degrees Celsius, which is considered to be the maximum temperature liable to be reached in the light devices in question.

The first example embodiment can advantageously be used for light devices equipped with an infrared filter, normally relatively heavy. The second example can advantageously be used for light devices equipped with a movable shield present in dual-function light devices; this is because the movable shield is normally lighter than the infrared filters, the motor torque normally necessary in the initialization phase thus being less great and, in the invention, the penalty in terms of transition time of the pivoting plate thus being minimal.

The limitation in current is effected by means of an electronic control card. This electronic card can be dedicated solely to the control of the DC motor, or also integrate verious other functionalities, such as for example the management of the AFS functions. It is possible to provide one electronic control card per light device according to the invention, or a single electronic card for a pair of light devices according to the invention. In addition, the electronic card can be used for regulating the motor current in order to be free of any variations in resistance in the latter due to the variations in temperature, the variations in motor torque being able to be limited in this way. The electronic card can also include a thermal protection device reducing the intensity of the motor current until extinction, in order to protect both the motor from excessive heating and the power stage supplying the motor.

By virtue of the invention, a solution for the motorization of pivoting plates is available which is compact, and with which the heating of the motor is controlled, in particular when it is functioning in locked torque.

What is claimed is:

1. A light device comprising:
    a light source emitting light rays towards an exit surface of the light device in order to produce a light beam;
    a pivoting plate movable between a passive position in which it does not intercept the light rays emitted by the light source and an active position in which it intercepts at least some of the light rays emitted by the light source;
    a motor for selectively moving the pivoting plate from the active position to the passive position during an initialization phase and a transition phase and for maintaining the pivoting plate in the passive position during a holding phase, the motor being a DC motor whose current supply may exceed a previously determined limitation threshold during the initialization phase and the transition phase and is limited at or below the previously determined limitation threshold during the holding phase; and
    a return spring for returning the pivoting plate from the passive position to the active position when the motor is no longer electrically supplied.

2. A light device as claimed in claim 1, wherein the limitation in current to the limitation threshold is observed throughout the holding phase.

3. A light device as claimed in claim 1, wherein the limitation in current to the limitation threshold is observed as soon as the DC motor is switched on.

4. A light device as claimed in claim 1, wherein the limitation threshold corresponds to a value of the intensity of the supply current to the motor for obtaining a mechanical torque of the motor necessary so as to compensate for the effect of the return spring during the holding phase.

5. A light device as claimed in claim 4, wherein the limitation threshold is calculated for a maximum temperature liable to be reached by the light device.

6. A light device as claimed in claim 1, wherein the limitation in the current supply to the DC motor is achieved by means of an electronic control card.

7. A light device as claimed in claim 1, wherein the pivoting plate is an infrared filter.

8. A light device as claimed in claim 1, wherein the pivoting plate is a movable shield for producing a dual-function dipped/main beam light.

9. A mode of transportation, wherein said mode of transportation comprises
    an automobile, and
    a light device, wherein said light device is adapted to provide light for operating said automobile, said light device comprising
        a light source emitting light rays towards an exit surface of the light device in order to produce a light beam;
        a pivoting plate able to move between a passive position in which it does not intercept the light rays emitted by the light source and an active position in which it intercepts at least some of the light rays emitted by the light source;
        a motor for moving the pivoting plate from the active position to the passive position during an initialization phase and a transition phase and maintaining the pivoting plate in the passive position during a holding phase, the motor being a DC motor whose current supply may exceed a previously determined limitation threshold during the initialization phase and the transition phase and is limited at or below the previously determined limitation threshold during the holding phase; and
        a return spring for returning the pivoting plate from the passive position to the active position when the motor is no longer electrically supplied.

10. A light device as claimed in claim 1, wherein the movement of the pivoting plate by the DC motor from the active position to the passive position comprises a first initialization phase and a second transition phase.

11. A mode of transportation as claimed in claim 9, wherein the movement of the pivoting plate by the DC motor from the active position to the passive position comprises a first initialization phase and a second transition phase.

12. A light device comprising:
    a light source emitting light rays towards an exit surface of the light device in order to produce a light beam;
    a pivoting plate movable between a passive position in which it does not intercept the light rays emitted by the light source and an active position in which it intercepts at least some of the light rays emitted by the light source;
    a return spring which exerts a force on the pivoting plate for yieldably biasing the pivoting plate toward the active position; and
    a DC motor for selectively moving the pivoting plate from the active position to the passive position during an initialization phase and a transition phase and for maintaining the pivoting plate in the passive position during a holding phase, wherein the current supplied to the motor may exceed a previously determined limitation threshold during the initialization phase and the transition phase and is limited at or below the previously determined limitation threshold during the holding phase.

13. A light device as claimed in claim 12, wherein the limitation in current to the limitation threshold is observed throughout the holding phase.

14. A light device as claimed in claim 12, wherein the limitation threshold corresponds to a value of the intensity of the supply current to the motor for obtaining a mechanical torque of the motor necessary overcome the biasing force exerted by the return spring on the pivoting plate.

15. A light device as claimed in claim 12, wherein the limitation in the current supply to the DC motor is achieved by means of an electronic control card.

16. A light device as claimed in claim 12, wherein the pivoting plate is an infrared filter.

17. A light device as claimed in claim 12, wherein the pivoting plate is a movable shield for producing a dual-function dipped/main beam light.

* * * * *